US012798351B2

(12) United States Patent
Kunimasa

(10) Patent No.: US 12,798,351 B2
(45) Date of Patent: Nov. 17, 2026

(54) BATTERY MOUNTING STRUCTURE IN FRAME VEHICLE

(71) Applicant: TOYOTA JIDOSHA KABUSHIKI KAISHA, Toyota (JP)

(72) Inventor: Takayuki Kunimasa, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 253 days.

(21) Appl. No.: 18/663,300

(22) Filed: May 14, 2024

(65) Prior Publication Data

US 2025/0033456 A1 Jan. 30, 2025

(30) Foreign Application Priority Data

Jul. 24, 2023 (JP) ................................ 2023-120291

(51) Int. Cl.
*B60K 1/04* (2019.01)
*B60K 6/28* (2007.10)

(52) U.S. Cl.
CPC .................. *B60K 1/04* (2013.01); *B60K 6/28* (2013.01); *B60K 2001/0438* (2013.01); *B60Y 2200/91* (2013.01); *B60Y 2200/92* (2013.01); *B60Y 2400/112* (2013.01)

(58) Field of Classification Search
CPC .............. B60K 1/04; B60K 2001/0438; B60K 2001/0416; B60K 2001/0433; B60K 2001/0455; B60K 6/28; B60Y 2200/92; B60Y 2200/91; B60Y 2400/112
See application file for complete search history.

(56) References Cited

U.S. PATENT DOCUMENTS

2013/0133961 A1* 5/2013 Matsuda .................. B60K 1/04 903/951
2014/0302362 A1* 10/2014 Takizawa ............ H01M 10/625 429/83
2019/0009661 A1* 1/2019 Okamura ............ H01M 50/249

FOREIGN PATENT DOCUMENTS

JP S5659482 U * 5/1981 ............... B60K 1/04
JP 2000-085376 A 3/2000
JP 2005-050616 A 2/2005
JP 2013014274 A * 1/2013
JP 2018-103765 A 7/2018
WO WO-2022244991 A1 * 11/2022 .......... H01M 50/249

* cited by examiner

*Primary Examiner* — Lori Wu
(74) *Attorney, Agent, or Firm* — SoraIP, Inc.

(57) ABSTRACT

The battery mounting structure of the frame vehicle includes a pair of left and right side rails extending in the vehicle front-rear direction and a plurality of cross members extending in the vehicle width direction and connecting the side rails, and includes a frame to which the vehicle body is attached, a battery disposed on the vehicle upper side of the frame, and a cover member disposed on the vehicle width direction outer side of the battery and configured to be detachable from the vehicle body.

6 Claims, 6 Drawing Sheets

BATTERY MOUNTING STRUCTURE IN FRAME VEHICLE

CROSS-REFERENCE TO RELATED APPLICATION

This application claims priority to Japanese Patent Application No. 2023-120291 filed on Jul. 24, 2023, incorporated herein by reference in its entirety.

BACKGROUND

1. Technical Field

The present disclosure relates to a battery mounting structure in a frame vehicle.

2. Description of Related Art

There has hitherto been known a battery holding device for an electrified vehicle, including a holding bracket that holds a battery disposed between two frames extending in the vehicle length direction of a truck and a coupling bracket that couples the holding bracket to the frames via a coupling portion, in which the coupling portion is disposed on the lower side of the frames in the vehicle height direction (see Japanese Unexamined Patent Application Publication No. 2018-103765 (JP 2018-103765 A), for example).

SUMMARY

When the battery is disposed between the frames, however, the ground clearance of the vehicle is reduced. Therefore, it is desirable to dispose the battery on the upper side of the frame. Since a vehicle body (cabin or deck) is attached on the upper side of the frame in a frame vehicle, however, it is necessary to detach the vehicle body from the frame each time the battery is to be maintained (replaced), complicating the work.

An object of the present disclosure is to obtain a battery mounting structure in a frame vehicle, the battery mounting structure allowing a battery to be maintained without detaching a vehicle body from a frame in the frame vehicle.

In order to achieve the above object, a first aspect of the present disclosure provides a battery mounting structure in a frame vehicle. The battery mounting structure includes:

- a frame to which a vehicle body is attached, the frame including a pair of right and left side rails extending in a vehicle front-rear direction, and a plurality of cross members extending in a vehicle width direction to couple the side rails;
- a battery disposed on a vehicle upper side of the frame; and
- a cover member disposed on an outer side in the vehicle width direction, or on a vehicle rear side, of the battery and configured to be detachable from the vehicle body.

In the disclosure according to the first aspect, the battery is disposed on the vehicle upper side of the frame to which the vehicle body is attached, and the cover member configured to be detachable from the vehicle body is disposed on the outer side in the vehicle width direction, or on the vehicle rear side, of the battery. Thus, the battery can be pulled out toward the outer side in the vehicle width direction, or toward the vehicle rear side, by detaching the cover member from the vehicle body. That is, according to the present disclosure, the battery can be accessed from the outer side in the vehicle width direction, or from the vehicle rear side, in the frame vehicle, and therefore the battery can be maintained without detaching the vehicle body from the frame.

A second aspect of the present disclosure provides the battery mounting structure according to the first aspect, in which

- a floor panel may be disposed on the vehicle upper side of the battery, and an end portion of the floor panel on an outer side in the vehicle width direction may not overlap the battery in a side view.

In the disclosure according to the second aspect, an end portion of the floor panel on the outer side in the vehicle width direction does not overlap the battery in a side view, even if the floor panel is disposed on the vehicle upper side of the battery. Thus, the battery can be pulled out toward the outer side in the vehicle width direction by detaching at least the cover member disposed on the outer side in the vehicle width direction from the vehicle body.

A third aspect of the present disclosure provides the battery mounting structure according to the first or second aspect, in which

- the cover member may include at least a bumper cover.

In the disclosure according to the third aspect, the cover member includes at least a bumper cover. Thus, the work of detaching the cover member from the vehicle body is facilitated.

According to the present disclosure, as described above, the battery can be maintained without detaching the vehicle body from the frame in the frame vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment according to the present disclosure will be described in detail with reference to the drawings. For convenience of description, the arrow UP, the arrow FR, and the arrow RH appropriately shown in the figures indicate the upward direction of a vehicle, the forward direction of the vehicle, and the right direction of the vehicle, respectively. Further, in the following description, when the vertical, front-rear, and left-right directions are described without any special mention, it is assumed that the vertical direction of the vehicle, the front-rear direction of the vehicle front-rear direction, and the left-right direction (vehicle width direction) of the vehicle are indicated.

First Embodiment

Figure 1A:
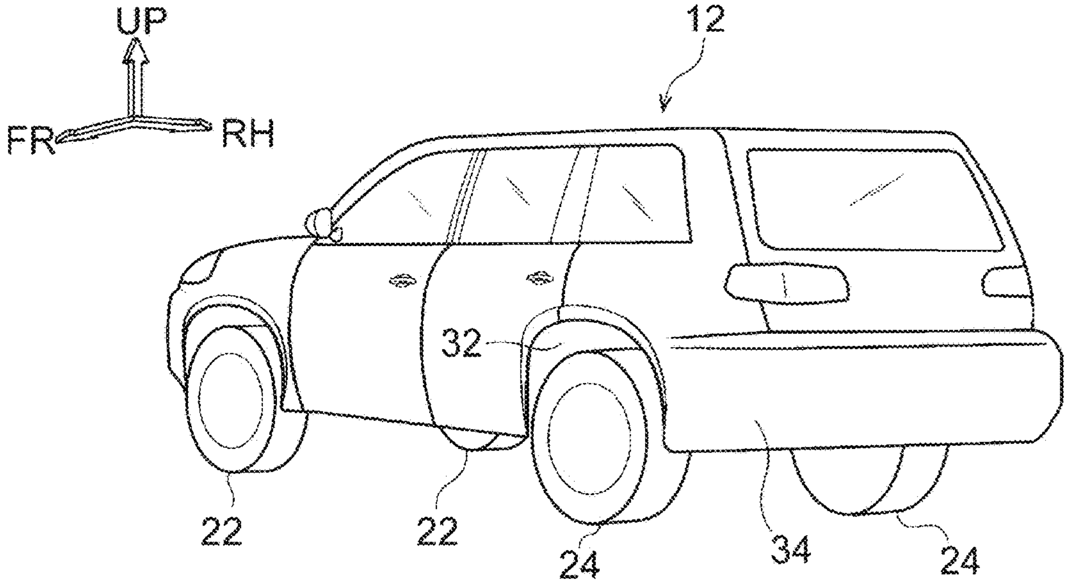
FIG. 1A is a perspective view of a frame vehicle according to a first embodiment.
Figure 1B:
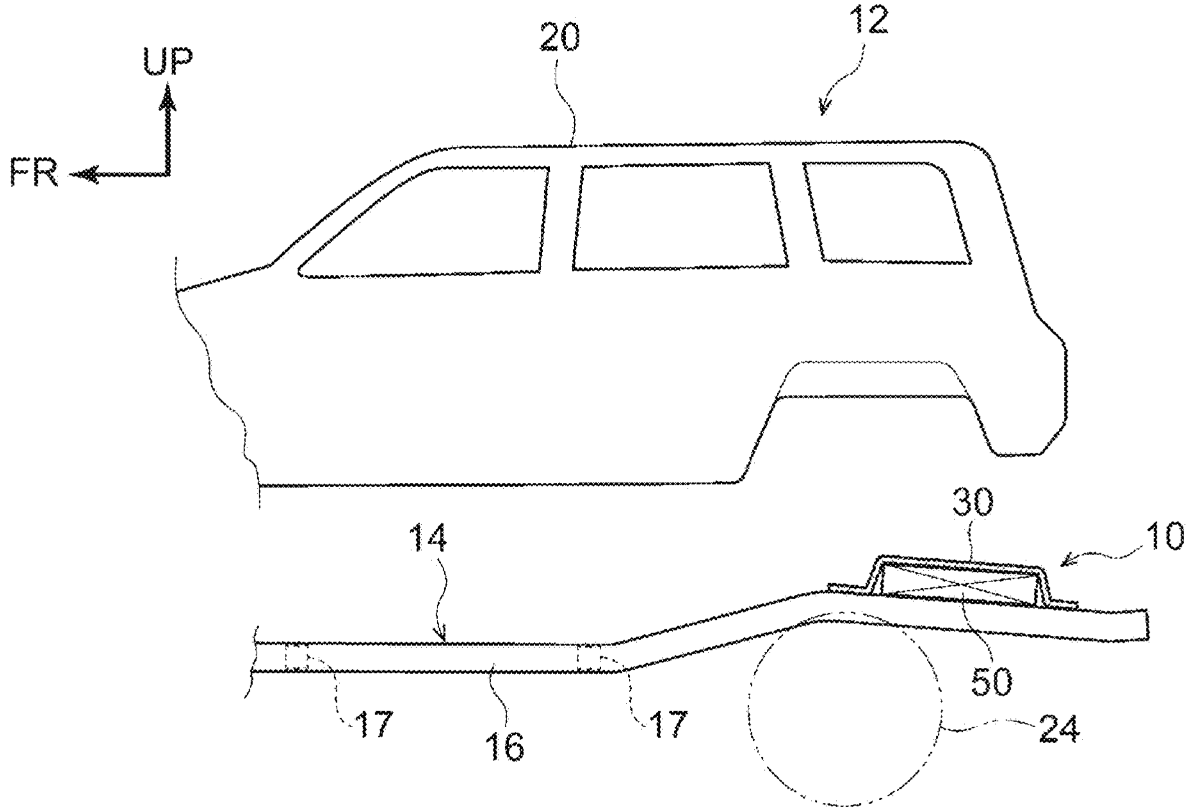
FIG. 1B is a schematic side view illustrating a frame and a cabin of the frame vehicle according to the first embodiment.
Figure 2:
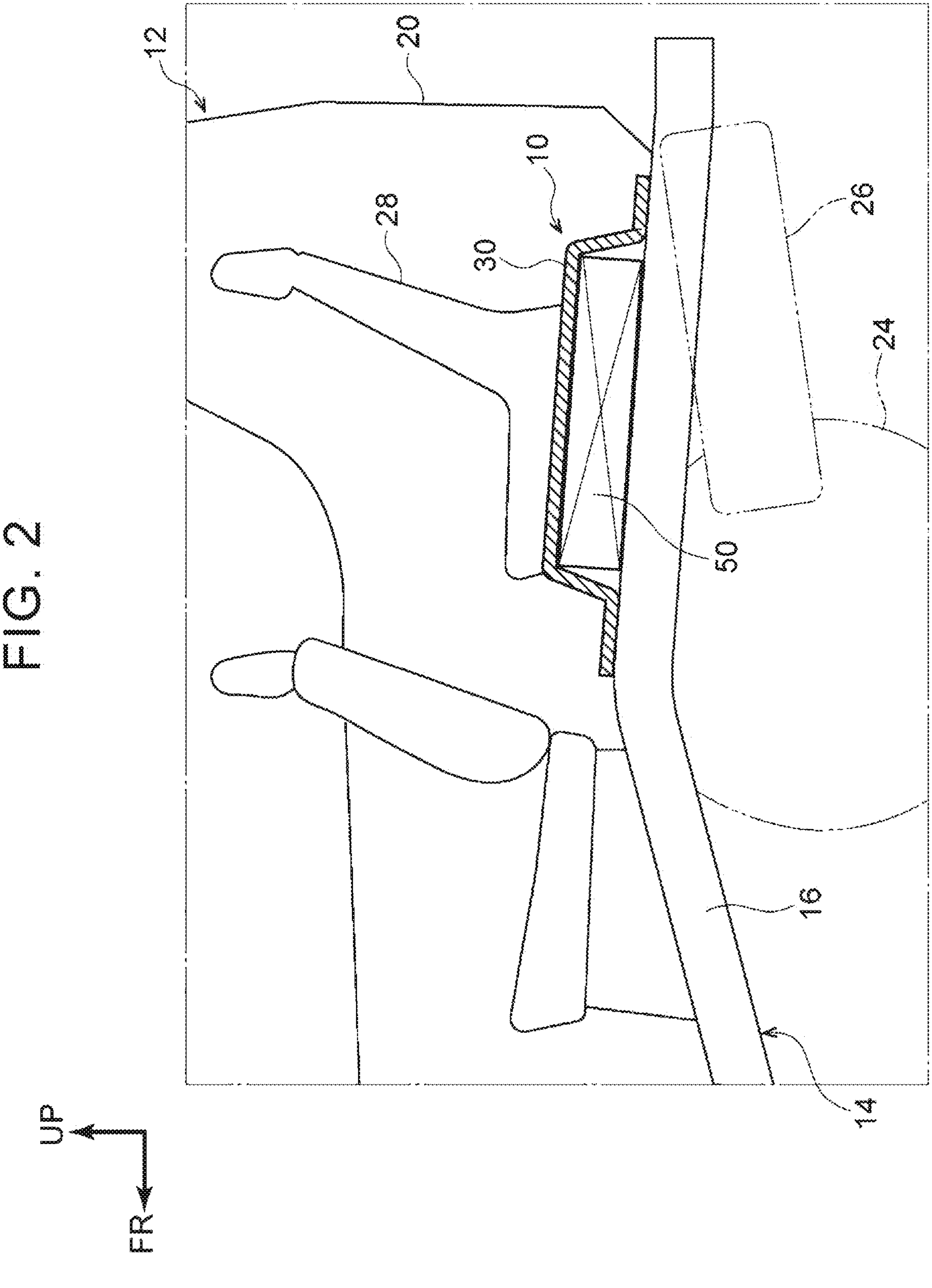
FIG. 2 is an enlarged schematic side view of the battery mounting structure according to the first embodiment.
Figure 3:
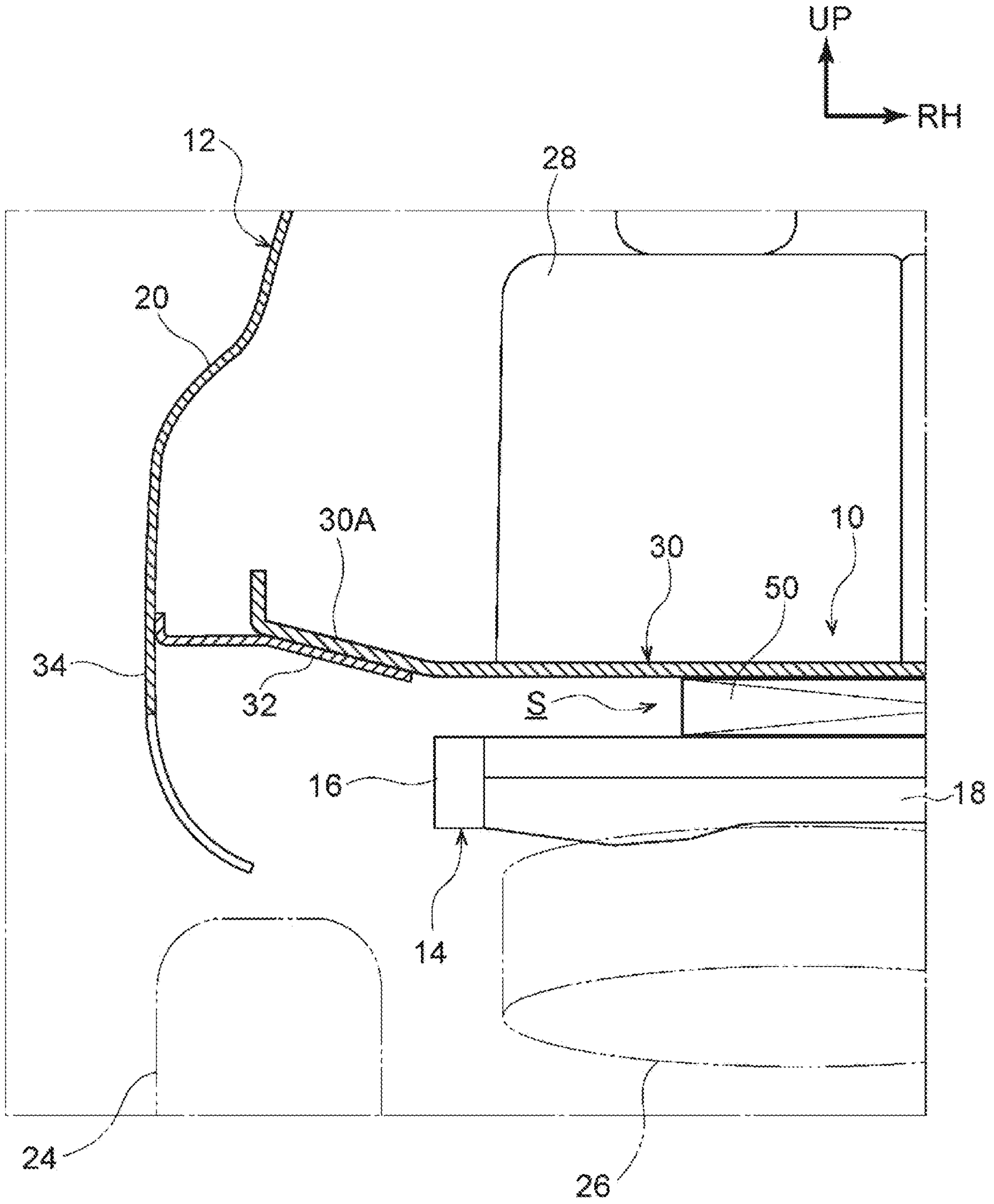
FIG. 3 is an enlarged schematic rear view of the battery mounting structure according to the first embodiment.

First, a first embodiment will be described. As shown in FIG. 1A and FIG. 1B, the frame vehicle 12 including the battery mounting structure 10 according to the first embodiment is a hybrid Sport Utility Vehicle (SUV) in which, for example, a battery 50 (see also FIG. 2 and FIG. 3) is mounted. As shown in FIG. 1B, FIG. 2, and FIG. 3, the frame vehicle 12 includes a frame 14 to which a cabin 20 as a vehicle body is mounted from above. The frame 14 includes a pair of left and right side rails 16 extending in the front-rear direction.

Front wheel 22 (see FIG. 1A) and rear wheels 24 are disposed on the front side and the rear side of the respective side rails 16. Therefore, in each of the side rails 16, the dimension in the vehicle width direction on the front side and the rear side is made shorter than the dimension in the vehicle width direction on the center side, and interference with the front wheels 22 and the rear wheels 24 is avoided. Further, the front side and the rear side of the respective side rails 16, since a suspension unit (not shown) or the like is arranged on the lower side is disposed on the upper side than the central portion side (see FIG. 1B and FIG. 2).

Further, a front bumper reinforcement (not shown) extending substantially along the vehicle width direction is installed at a front end portion of each side rail 16, and a rear bumper reinforcement 18 (see FIG. 3) extending substantially along the vehicle width direction is installed at a rear end portion of each side rail 16.

Between the respective side rails 16 between the front bumper reinforcement and the rear bumper reinforcement 18, a plurality of cross members 17 (see FIG. 1B) that extends in the vehicle width-direction are installed. In other words, the plurality of cross members 17 extends in the vehicle width direction to connect the side rails 16. As a result, the ladder-shaped frame 14 is formed. The cabin 20 is attached to the upper side of the frame 14 (see FIG. 1B).

In the frame vehicle 12 having the frame 14 and the cabin 20 as described above, as shown in FIG. 1B, FIG. 2, and FIG. 3, the battery 50 is disposed substantially horizontally above the rear portion of the frame 14. On the upper side of the battery 50, a floor panel 30 having a substantially hat shape is disposed in a side view viewed from the vehicle width direction. In other words, an accommodation portion (accommodation space) S for accommodating the battery 50 is formed between the frame 14 and the floor panel 30.

A spare tire 26 is disposed on the lower side of the rear portion of the frame 14. The spare tire 26 is inclined such that the front side thereof is low and the rear side thereof is high in a side view (see FIG. 2). The floor panel 30 is made of sheet metal, and a third seat 28 is disposed above the floor panel 30.

The vehicle-width-direction outer end portion 30A of the floor panel 30 does not overlap with the battery 50 in a side view. In other words, the lower surface of the vehicle-width-direction outer end portion 30A of the floor panel 30 is positioned above the upper surface of the battery 50 when viewed from the front-rear direction (see FIG. 3). As a result, the battery 50 is configured to be able to be inserted and pulled out from the outside in the vehicle width direction with respect to the accommodation portion S. The illustrated vehicle-width-direction outer end portion 30A is formed in a substantially "L" shape inclined toward the obliquely outer upper side (the vehicle width direction outer side and the upward side) when viewed from the front-rear direction.

A fender liner 32 as an example of a cover member is detachably attached to the cabin 20 on the vehicle width direction outer side of the battery 50. The vehicle width direction inner end portion of the fender liner 32 may be detachably attached to the lower surface of the vehicle-width-direction outer end portion 30A of the floor panel 30.

Further, a bumper cover 34 as an exemplary cover member is detachably attached to the cabin 20 on the vehicle-width-direction outer side of the battery 50 (fender liner 32) (see also FIG. 1A). Note that "detachably attached" in the first embodiment means being attached with a bolt, a clip, or the like.

Next, the operation of the battery mounting structure 10 in the frame vehicle 12 according to the first embodiment configured as described above will be described.

As described above, the battery 50 is disposed on the upper side of the frame 14 to which the cabin 20 is attached from the upper side (accommodation portion S between the frame 14 and the floor panel 30), and the bumper cover 34 and the fender liner 32 configured to be detachable from the cabin 20 are disposed on the vehicle width direction outer side of the battery 50. In addition, the vehicle-width-direction outer end portion 30A of the floor panel 30 does not overlap with the battery 50 in a side view (positioned above the upper surface of the battery 50 when viewed from the front-rear direction).

Therefore, by removing at least the bumper cover 34 and the fender liner 32 from the cabin 20, the outside of the battery 50 in the vehicle width direction is opened. That is, even if the floor panel 30 is disposed on the upper side of the battery 50, by removing the bumper cover 34 and the fender liner 32 from the cabin 20, the battery 50 can be pulled out to the outside in the vehicle width direction (the battery 50 can be removed from the frame vehicle 12).

As described above, according to the first embodiment, the battery 50 can be accessed from the outside in the vehicle width direction in the frame vehicle 12. Therefore, the battery 50 can be serviced (replaced) without removing the cabin 20 from the frame 14. Moreover, the cover member to be removed from the cabin 20 includes a fender liner 32 and a bumper cover 34 attached to the cabin 20 by clips or the like. Therefore, it is possible to easily remove them from the cabin 20.

When the maintenance (replacement) of the battery 50 is completed, the battery 50 is inserted into the accommodation portion S from the outside in the vehicle width direction. The fender liner 32 is attached to the cabin 20, and the bumper cover 34 is attached to the cabin 20. As described above, according to the first embodiment, the frame vehicle 12 can be returned to the original state without removing the cabin 20 from the frame 14.

Second Embodiment

Next, a second embodiment will be described. The same parts as those in the first embodiment are designated by the same reference signs, and detailed description thereof will be omitted as appropriate.

Figure 4:
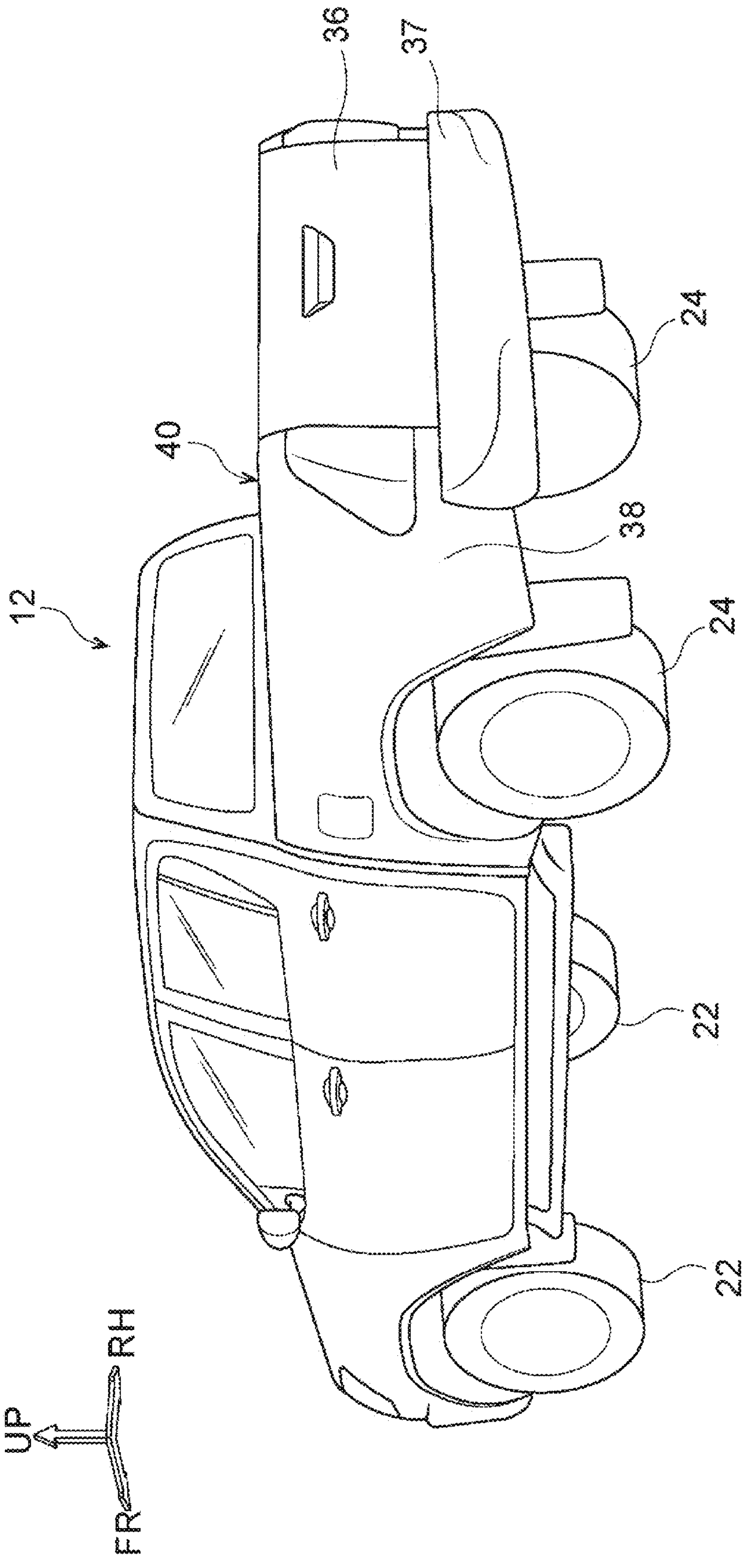
FIG. 4 is a perspective view showing a frame vehicle according to a second embodiment.
Figure 5:
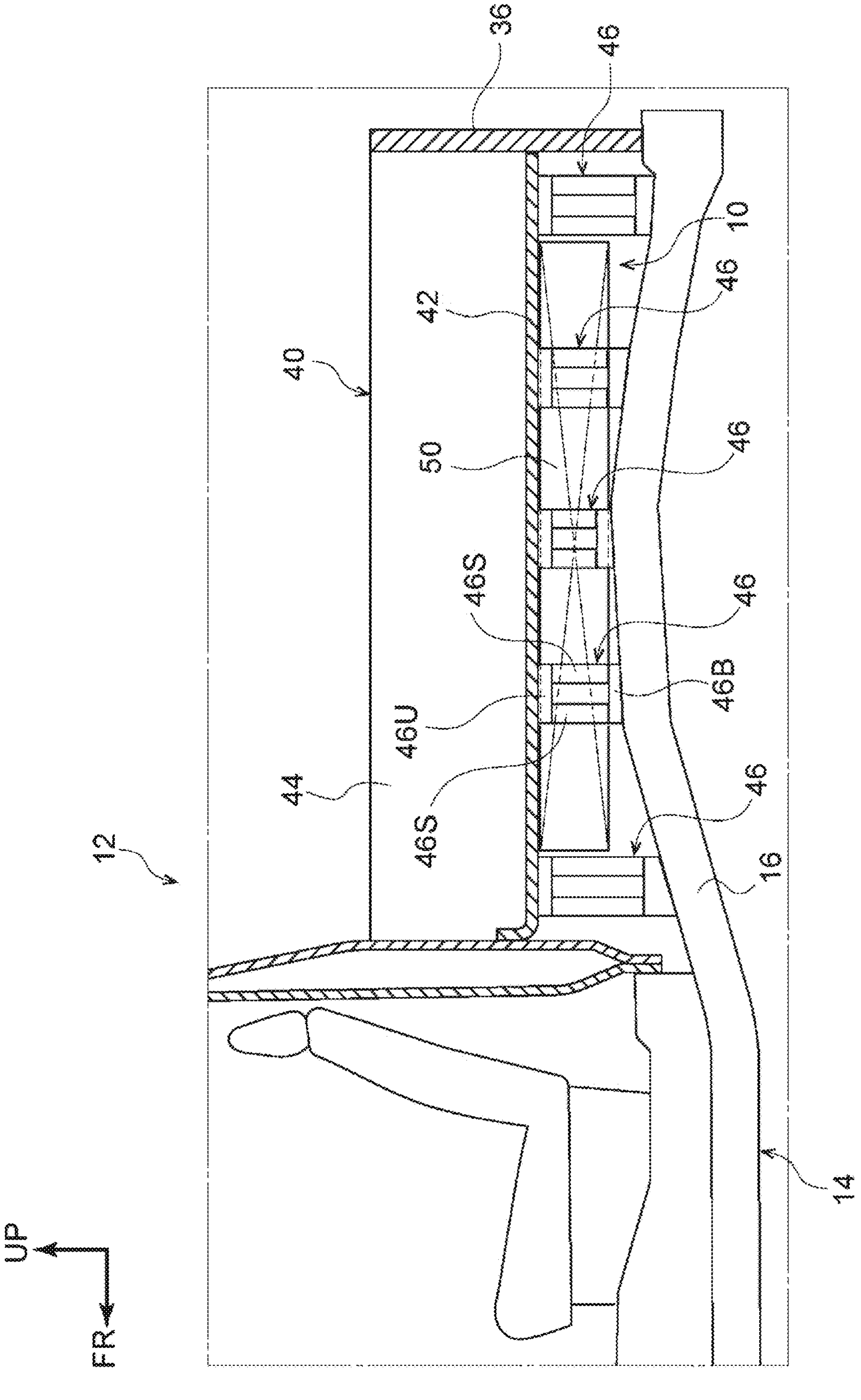
FIG. 5 is a schematic side view illustrating an enlarged battery mounting structure according to a second embodiment.
Figure 6:
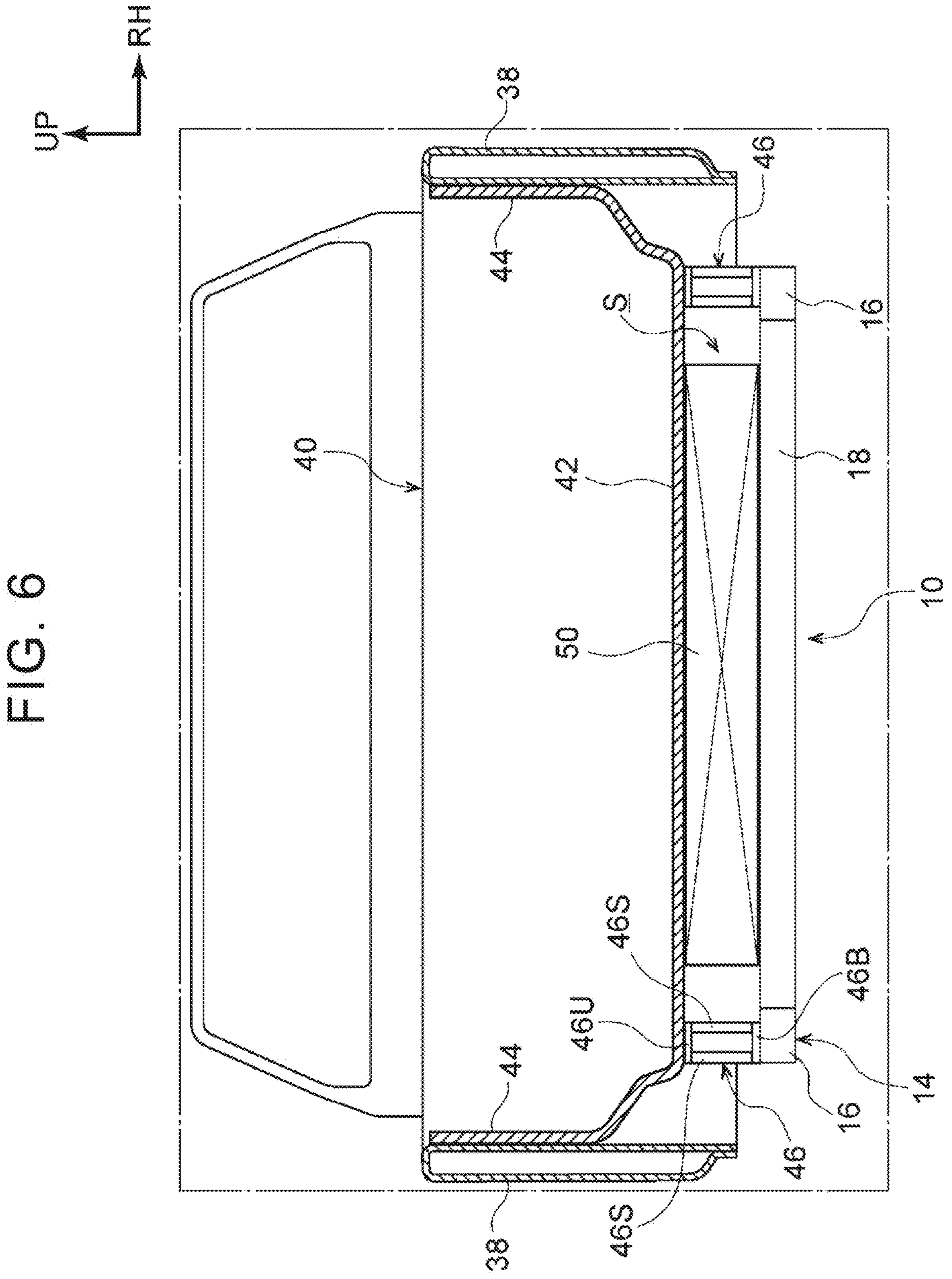
FIG. 6 is a schematic rear view illustrating an enlarged battery mounting structure according to the second embodiment.

As shown in FIGS. 4 to 6, the frame vehicle 12 provided with the battery mounting structure 10 according to the second embodiment is a hybrid pickup truck on which, for example, a battery 50 (see FIG. 5 and FIG. 6) is mounted. As shown in FIG. 5 and FIG. 6, on the upper surface of the left and right pair of side rails 16, in a side view, deck reinforce 46 of differing height, respectively (e.g., five) are detachably attached.

Each of the deck reinforcements 46 is configured by connecting a bottom plate 46B and a top plate 46U having a substantially rectangular flat plate shape to each other by four support 46S having a quadrangular prism shape. The upper surface of the top plate 46U of each deck reinforcement 46 to which the lower surface of the bottom plate 46B is attached to each side rail 16 at a predetermined distance in the front-rear direction is flush in a side view, and the upper surface of the top plate 46U of each deck reinforcement 46 is detachably attached to the lower surface of the bottom plate 42 of the deck (loading platform) 40 as a part of the vehicle body.

In other words, the respective heights of the deck reinforcements 46 are set in accordance with the shapes of the respective side rails 16 so that the upper surface of the top plate 46U thereof is flush in a side view. The bottom plate 42 of the deck 40 is horizontally supported by the side rails 16 via the respective deck reinforcements 46. In a side view, the battery 50 is mounted in a space between the frame 14 (side rail 16) and the bottom plate 42. That is, a space between the frame 14 and the bottom plate 42 serves as the accommodation portion S in which the battery 50 is housed.

Further, a deck back panel 36 as an example of a cover member constituting the rear plate of the deck 40 is detachably attached to the deck 40 on the rear side of the deck reinforcement 46 on the rearmost end side. A bumper cover 37 (see FIG. 4) as an exemplary cover member is detachably attached to the deck 40 below the deck back panel 36.

In addition, a fender 38 (see FIG. 4 and FIG. 6) as an exemplary covering member is detachably attached to the side plate 44 (see FIG. 6) of the deck 40 on the vehicle-width-direction outer side of the deck reinforcement 46. The side plate 44 of the deck 40 is formed integrally with the bottom plate 42 of the deck 40. Further, the term "detachably attached" in the second embodiment means being attached with a bolt, a clip, or the like in the same manner as in the first embodiment.

Next, the operation of the battery mounting structure 10 in the frame vehicle 12 according to the second embodiment configured as described above will be described. The description of the operation common to the first embodiment will be omitted as appropriate.

As described above, the battery 50 is disposed on the upper side of the frame 14 to which the deck 40 is attached via the deck reinforcement 46 (the accommodation portion S between the frame 14 and the bottom plate 42 of the deck 40). A deck back panel 36 and a bumper cover 37 configured to be detachable from the deck 40 are disposed on the rear side of the battery 50.

Therefore, at least the deck back panel 36 and the bumper cover 37 are removed from the deck 40, so that the rear side of the battery 50 is opened. That is, by removing the deck back panel 36 and the bumper cover 37 from the deck 40, the battery 50 can be pulled out to the rear side (the battery 50 can be removed from the frame vehicle 12).

As described above, according to the second embodiment, the battery 50 can be accessed from the rear side in the frame vehicle 12. Therefore, the battery 50 can be serviced (replaced) without removing the deck 40 from the frame 14. Moreover, a cover member to be removed from the deck 40 includes a deck back panel 36 and a bumper cover 37 attached to the deck 40 by clips or the like. Therefore, it is possible to easily remove them from the deck 40.

When the maintenance (replacement) of the battery 50 is completed, the battery 50 is inserted into the accommodation portion S from the rear side. Then, the bumper cover 37 is attached to the deck 40, and the deck back panel 36 is attached to the deck 40. As described above, according to the second embodiment, the frame vehicle 12 can be returned to the original state without removing the deck 40 from the frame 14.

Further, in the second embodiment, the fender 38 is detachable from the side plate 44 of the deck 40, and the deck reinforcement 46 is also detachable from the side rail 16 and the bottom plate 42 of the deck 40. Therefore, when the fender 38 is removed from the side plate 44 of the deck 40 and the three deck reinforcements 46 on the center side in the front-rear direction except for the front end side and the last end side among the five deck reinforcements 46 arranged side by side in the front-rear direction are removed from between the side rail 16 and the bottom plate 42 of the deck 40, the outside of the battery 50 in the vehicle width direction is also opened.

That is, the length of the battery 50 in the front-rear direction is equal to or less than the distance between the rear surface of the deck reinforcement 46 on the front end side and the front surface of the deck reinforcement 46 on the last end side in a side view. Therefore, by removing the fender 38 from the side plate 44 of the deck 40 and removing the three deck reinforcements 46 on the center side in the front-rear direction from between the side rail 16 and the bottom plate 42 of the deck 40, the battery 50 can be pulled out to the outside in the vehicle width direction.

As described above, according to the second embodiment, the battery 50 can also be accessed from the outside in the vehicle width direction in the frame vehicle 12. Therefore, the battery 50 can be serviced (replaced) without removing the deck 40 from the frame 14. When the maintenance (replacement) of the battery 50 is completed, the battery 50 is inserted into the accommodation portion S from the outside in the vehicle width direction. Then, three deck reinforcements 46 on the center side in the front-rear direction are attached between the side rails 16 and the bottom plate 42 of the deck 40, and the fender 38 is attached to the side plate 44 of the deck 40.

As described above, the battery mounting structure 10 in the frame vehicle 12 according to the present embodiment has been described based on the drawings, but the battery mounting structure 10 in the frame vehicle 12 according to the present embodiment is not limited to the illustrated one, and can be appropriately changed in design without departing from the gist of the present disclosure.

For example, the frame vehicle 12 in the present embodiment is not limited to a hybrid electric vehicle, and may be a plug-in hybrid electric vehicle (PHEV) or a battery electric vehicle (BEV). In addition, the frame vehicle 12 in the present embodiment is not limited to the illustrated SUV or the pick-up truck, and may be another type of vehicle.

What is claimed is:

1. A battery mounting structure in a frame vehicle, the battery mounting structure comprising:

a frame to which a vehicle body is attached, the frame including a pair of right and left side rails extending in a vehicle front-rear direction, and a plurality of cross members extending in a vehicle width direction to couple the side rails;

a battery disposed on a vehicle upper side of the frame;

a floor panel disposed on the vehicle upper side of the battery; and a cover member disposed on an outer side in the vehicle width direction, or on a vehicle rear side, of the battery and configured to be detachable from the vehicle body, wherein an outer end portion of the floor panel in the vehicle width direction is positioned at the outer side in the vehicle width direction and is formed in an L shape inclined toward an upper side of the vehicle when viewed from the vehicle front-rear direction.

2. The battery mounting structure according to claim 1, wherein the cover member includes at least a bumper cover.

3. The battery mounting structure according to claim 1, wherein a spare tire is disposed on a lower side of a rear portion of the frame below the battery.

4. The battery mounting structure according to claim 1, wherein the cover member includes a bumper cover and a fender liner.

5. The battery mounting structure according to claim 4, wherein an inner end portion of the fender liner in the vehicle width direction is detachably attached to a lower surface of the outer end portion of the floor panel.

6. The battery mounting structure according to claim 1, wherein the battery is disposed horizontally above a rear portion of the frame in the vehicle front-rear direction.

* * * * *